United States Patent Office 3,201,397
Patented Aug. 17, 1965

3,201,397
ALKYL ESTERS OF ALICYCLIC DIENE COMPOUNDS HAVING 7 TO 18 RING CARBON ATOMS AND HAVING A PYRROLIDINO RADICAL, A PIPERIDINO RADICAL, A MORPHOLINO RADICAL OR THE RADICAL OF HEXAMETHYLENEIMINE ATTACHED TO THE ALICYCLIC RING
Kent C. Brannock, Kingsport, Tenn., assignor to Eastman Kodak Company, Rochester, N.Y., a corporation of New Jersey
No Drawing. Filed Oct. 31, 1962, Ser. No. 234,545
12 Claims. (Cl. 260—247.2)

This invention relates to new alicyclic enamine compounds and to a process for their preparation.

The new alicyclic enamine compounds of the invention are represented, for the most part, by the formula:

(I) 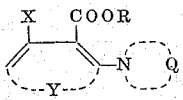

wherein R represents an alkyl group, Q represents the non-metallic elements necessary to complete a saturated heterocyclic nucleus, X represents a hydrogen atom or a —COOR group, wherein R has the meaning previously assigned to it, and Y represents a methylene chain containing 3 to 14 carbon atoms.

The new alicyclic enamine compounds of the invention are prepared by reacting an alicyclic enamine compound having the formula:

(II) 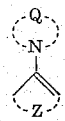

wherein Z represents a methylene chain having 2 to 13 carbon atoms with a compound having the formula:

(III)          X—C≡C—COOR wherein R and X have the meaning previously assigned to them.

In the novel process of the invention ring-enlargement takes place. The ring size increases by two carbon atoms. Thus, a starting alicyclic enamine having 5 carbon atoms in the alicyclic ring is converted to an alicyclic enamine having 7 carbon atoms in the alicyclic ring. Additionally, depending upon whether an acetylenemonocarboxylic acid alkyl ester or an acetylenedicarboxylic acid alkyl ester is employed in the reaction, the alicyclic enamine obtained contains one or two carboxylic acid alkyl ester groups. The process of the invention appears to involve the formation of a transient cycloalkene compound which undergoes a rearrangement leading to the alicyclic enamine compounds of the invention.

The alicyclic enamine compounds have utility, for example, as intermediate compounds. With one exception, they can be used to prepare the known carbocyclic ketones having 7 to 18 carbon atoms in the ring. The 8-membered alicyclic enamine compounds of the invention (Formula I) apparently cannot be used to prepare cyclooctanone. Thus cyclononanone, cyclodecanone, cycloundecanone, cyclododecanone, cyclotridecanone, cyclotetradecanone, cyclopentadecanone, cyclohexadecanone, cycloheptadecanone and cyclooctadecanone can be prepared. All these compounds are known.

The higher carbocyclic ketones, especially those having 14 to 18 carbon atoms in the ring are useful as perfume ingredients, possessing utility both as an odorant or a fixative. Cyclotetradecanone, for example, is a useful perfume with a musk-like odor. Cyclopentadecanone is at present sold for use as a perfume with a musk-like door.

Carbocyclic ketones having 10-to-18 membered rings are discussed in the article, "Synthesis of Carbocyclic Ketones of 10- to 18-Membered Rings," by L. Ruzicka, M. Stoll and H. Schinz, Helvetica Chim. Acta, vol. 9, pages 249–264 (1926). The carbocyclic ketones having 14 to 18 carbon atoms in the ring are stated to have a characteristic musk odor. Those having 10–12 carbons have a camphor odor while cyclotridecanone has a slight cedar-wood odor.

The carbocyclic ketones also have utility, for example, as solvents and chemical intermediates. They can be converted to the corresponding oximes which undergo the Beckmann rearrangement to give lactams. The polymerization of lactams to form polyamides is well known.

Illustrative of the saturated heterocyclic nucleus that is present in the alicyclic enamine compounds of our invention are the pyrrolidinyl, the piperidyl and the morpholinyl radicals and the radical of hexamethyleneimine.

The length of the alkyl group represented by R appears to be immaterial. From the viewpoint of practicality R is preferably a lower alkyl group such as a methyl, an ethyl, a propyl or a butyl radical, especially a methyl or ethyl radical. However, as indicated hereinbefore, R may be a higher alkyl radical than those named.

The formation of the alicyclic enamine compounds of the invention is believed to take place in the manner indicated hereinafter. However, it is to be clearly understood that the mechanism of the reaction is not part of the invention. The reaction will be illustrated in connection with the formation of a 7-membered ring compound.

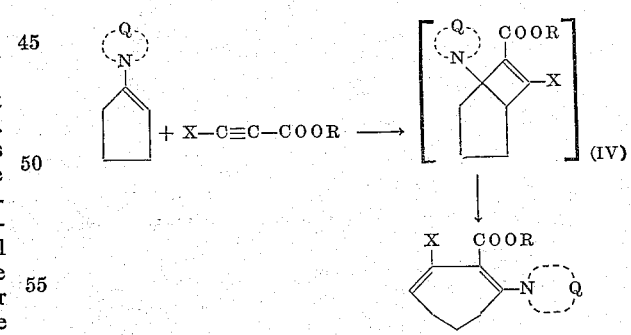

Formula IV is that of the transient cycloalkene compound believed to be formed. This compound rearranges to form the new alicyclic compounds of the invention.

The alicyclic enamine compounds having the formula numbered II are prepared by reacting an alicyclic ketone with a saturated heterocyclic compound containing a nitrogen atom in the ring. Pyrrolidine, piperidine, morpholine and hexamethyleneimine are illustrative of the heterocyclic compounds employed. Pentanone, hexanone, heptanone, octanone, nonanone, decanone, undecanone, dodecanone, tridecanone, tetradecanone, pentadecanone and hexadecanone are illustrative of the alicyclic ketones employed in the reaction under discussion. Ring-enlargement is not involved in this reaction.

A number of the alicyclic enamine compounds having the formula numbered II are known compounds. N-(1-cyclopenten-1-yl)-morpholine, N-(1-cyclohexen-1-yl)pyrrolidine and N - (1 - cyclohexen - 1 - yl)piperidine, for example, are known compounds. The compounds not specifically disclosed can be prepared in accordance with the methods used to prepare the known alicyclic enamine compounds having the formula numbered II. They can be prepared in accordance with the procedure described by M. E. Kuehne, Journal American Chemical Society, vol. 81, pages 5400–4 (1959).

The new process of the invention by which the new alicyclic enamine compounds of the invention are prepared is advantageously carried out in the presence of an organic solvent. No particular organic solvent need be employed. Ethyl ether, acetone, n-hexane, methyl alcohol, ethyl alcohol, benzene, dimethyl sulfoxide and dimethyl formamide are illustrative, but not limitative of the solvents that can be employed. Water is not used because of the danger of hydrolysis. As understood, a solvent should not react with any of the reactants during the reaction in which it is employed.

As illustrated hereinafter, the new alicyclic enamine compounds of the invention undergo hydrolysis. The hydrolysis can be carried out, for example, in aqueous hydrochloric acid. While the hydroxy form of the hydrolyzed compound is referred to hereinafter, it will be understood that tautomerism is involved and that an equilibrium exists between the hydroxy and ketone forms of the hydrolyzed compound. In the hydrolysis, the heterocyclic nucleus is removed. The enamine functions hydrolyze much more rapidly than the ester groups.

The 6-membered ring enamine compounds having the Formula II apparently do not undergo ring-enlargement with the acetylenic monoester compounds. However, they do undergo ring-enlargement with the dialkylacetylene dicarboxylate compounds. Only the 6-membered ring enamine compounds are peculiar in the respect noted.

The following examples illustrate the invention.

*Example 1*

15 grams (0.179 mole) of methyl propiolate were added over a 5 minute period to 27 grams (0.179 mole) of N-(1-cyclopenten-1-yl)piperidine in 75 ml. of acetonitrile. The temperature of the mixture rose to 85° C. and then dropped over a period of 30 minutes to 34° C. The acetonitrile was removed by heating the mixture to 120° C. under 90 mm. pressure. Methyl 2-(1-piperidyl)-1,6-cycloheptadiene-1-carboxylate having the formula:

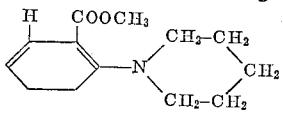

was obtained.

20 ml. of concentrated hydrochloric acid in 100 ml. of water were added to the methyl 2-(1-piperidyl)-1,6-cycloheptadiene-1-carboxylate obtained as described hereinbefore. The resulting solution was allowed to stand for 5 hours at room temperature during which time an oil settled out. The oil was extracted with ether and distilled to give 8 grams (27%) of methyl 2-hydroxy-1,6-cycloheptadiene-1-carboxylate, B.P. 71–76° C. at 1.5 mm., $n_D^{20}$ 1.5236.

By the use of an equivalent amount of N-(1-cyclopenten-1-yl)pyrrolidine in place of N-(1-cyclopenten-1-yl)piperidine in the foregoing example methyl-2-(1-pyrrolidyl)-1,6-cycloheptadiene-1-carboxylate was obtained.

Upon hydrolysis with 20 ml. of concentrated hydrochloric acid in 100 ml. of water and treatment in the manner described hereinbefore methyl 2-hydroxy-1,6-cycloheptadiene-1-carboxylate was obtained. The cycloheptadiene compound has a strong, pleasant odor very similar to that of methyl salicylate, and gives stable chelate salts with cupric and cobaltous ions. On hydrogenation it absorbs one mole of hydrogen and when the resulting product is saponified and acidified decarboxylation occurs leading to cycloheptanone in 74% over-all yield. Similar results are obtained when ether is substituted for acetonitrile as the solvent.

*Example 2*

28.4 grams of dimethyl acetylenedicarboxylate were added over a period of 10 minutes to 30.2 grams of N-(1-cyclopenten-1-yl)pyrrolidine in 150 ml. of ethyl ether with cooling to keep the temperature at 25° C.–35° C. The reaction mixture resulting was allowed to stand for 30 minutes after which the ethyl ether was removed by evaporation on a steam bath. On cooling the residue crystallized completely. Upon recrystallization from a mixture of n-hexane and benzene 39.8 grams (71%) of dimethyl-3-[1 - pyrrolidinyl]-2,7-cycloheptadiene-1,2-dicarboxylate having a melting point of 147° C.–148° C. were obtained.

11.5 grams of the dimethyl - 3-[1 - pyrrolidinyl]-2,7-cycloheptadiene-1,2-dicarboxylate obtained as just described were added to 10 ml. of concentrated hydrochloric acid in 40 ml. of water. The resulting mixture was allowed to stand for 15 hours at room temperature during which time an oil layer formed. The oil layer was extracted with ethyl ether and the extract was distilled to obtain 4.6 grams (49%) of dimethyl-3-hydroxy-2,7-cycloheptadiene - 1,2 - dicarboxylate having a boiling point of 101° C.–106° C. at .4 to .5 mm. This product has a pleasant odor reminiscent of that of carvone.

*Example 3*

(a) Dimethyl acetylenedicarboxylate (28.4 grams) was added over a 10-minute period to 30.2 grams of N-(1-cyclohexen-1-yl)pyrrolidine in 150 ml. of ether, with cooling, to keep the temperature at 25° C.–35° C. Toward the end of the addition, a crystalline precipitate appeared. The mixture was allowed to stand for 10 minutes and 150 ml. of pentane was added. The mixture was chilled and filtered to give 41 grams (70%) of dimethyl-1 - (1 - pyrrolidinyl)-bicyclo[4.2.0]-oct-7-ene-7, 8-dicarboxylate, M.P. 77–81° C. The latter compound is thermally unstable and undergoes considerable change on melting or on attempted crystallization from hexane. It can, however, be recrystallized from ether.

(b) A significant amount of rearrangement of the bicyclo-octene just described occurs on standing as shown by the following experiment. A solution of 14.7 grams of dimethyl - 1 - (1-pyrrolidinyl)bicyclo[4.2.0]-oct-7-ene-7,8-dicarboxylate in 40 ml. of water and 10 ml. of concentrated hydrochloric acid was allowed to stand at room temperature for three days. An oil layer separated slowly during this time. The oil was extracted with ether and distilled to give 2.5 grams of dimethyl-3-hydroxy-2,8-cyclooctadiene-1,2-dicarboxylate, B.P. 123–126° C. at 1 mm., which crystallized on standing, M.P. 74–5° C.

(c) Dimethyl-1-(1 - pyrrolidinyl)bicyclo[4.2.0]-oct-7-ene-7,8-dicarboxylate (37 grams) was heated on a steam bath at 85° C. for 18 hours. The resulting oil was dissolved in 100 ml. of ether and chilled. Filtration gave 4 grams of dimethyl-3-(1-pyrrolidinyl)-2,8-cyclooctadiene-1,2-dicarboxylate, M.P. 141° C.–142° C. Hydrolysis of the latter as described in (b) above gave a 53% yield of dimethyl - 3 - hydroxy-2,8-cyclooctadiene-1,2-dicarboxylate.

*Example 4*

To a solution of 3.86 grams of N-(1-cyclooctenyl)piperidine in 25 ml. of ether was added a solution of 3.4 grams of diethyl acetylenedicarboxylate in 25 ml. of ether over a 10-minute period. The mixture was allowed to stand for ½ hour and the ether was removed by heating on a steam bath. The residue was crystallized from hexane to give 4.4 grams (61%) of diethyl-3-piperidino-2, 10-cyclodecadiene-1,2-dicarboxylate, M.P. 91–92° C.

Example 5

To a solution of 3.3 grams (0.02 mole) of N-1-cycloheptenyl)pyrrolidine in 25 ml. of ether was added over a 5-minute period, 2.8 grams of dimethyl acetylenedicarboxylate, with cooling to keep the temperature at 30° C.–35° C. The mixture was allowed to stand at room temperature for ½ hour and then cooled to 10° C. Filtration gave 3.9 grams of dimethyl-3-(1-pyrrolidinyl)-2,9-cyclononadiene-1,2-dicarboxylate, M.P. 109.5–110.5° C. Evaporation of the filtrate and addition of pentane gave an additional 1.8 grams of the same product. The combined yield was 93%.

Example 6

A solution of 74 grams of dimethyl-3-(1-pyrrolidinyl)-2,7-cycloheptadiene-1,2-dicarboxylate (prepared as in Example 2) in 500 ml. of acetic acid was subjected to hydrogenation over 2 grams of platinum oxide at room temperature and 40 p.s.i. hydrogen pressure. Approximately 2 moles of hydrogen was absorbed per mole of diene. The mixture was filtered and the acetic acid removed by distillation in vacuo. The residue was dissolved in a solution of 75 grams of potassium hydroxide in 250 ml. of water and 250 ml. of methanol, and the resulting solution was heated on a steam bath for 23 hours while the methanol and most of the water evaporated. Water, 150 ml., was added and the solution was acidified with hydrochloric acid. On cooling and filtration 31.5 grams (73%) of crude 2-cycloheptene-1,2-dicarboxylic acid was obtained. After two recrystallizations from water 16.7 grams (39%) of 2-cycloheptene-1,2-dicarboxylic acid melting at 168° C.–170° C. were obtained. Hydrogenation of the latter as its sodium salt in aqueous solution over Raney nickel gave a 95% yield of cis-cycloheptane-1,2-dicarboxylic acid, M.P. 130–131° C., which was isomerized readily to the trans isomer, M.P. 156–157° C., by heating with dilute sulfuric acid. The ultility of such dicarboxylic acids as intermediates for polymers and plasticizers is well known in the art.

Example 7

28.4 grams of dimethyl acetylenedicarboxylate were added over a period of 10 minutes to 27.4 grams of 1-(2,5-dihydro-3-furyl)pyrrolidine.

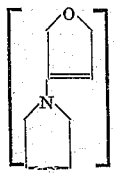

in 150 ml. of ether, with cooling, to keep the temperature at 25° C.–35° C. Upon working up the reaction mixture in accordance with the procedure described in Example 2, a 17% yield of dimethyl-1(1-pyrrolidinyl)-6 - oxa-1,3-cycloheptadiene-2,3-dicarboxylate melting at 162° C.–163° C. was obtained.

*Analysis.*—Calculated for $C_{14}H_{19}NO_5$: C=59.8, H=6.6. Found: C=59.88, H=6.66.

Example 8

0.2 gram mole of dimethyl acetylenedicarboxylate and 0.2 gram mole of N-(1-cyclododecenyl)pyrrolidine were reacted together and the reaction mixture was worked up in accordance with the procedure described in Example 2. A 91% yield of dimethyl-3-(1-pyrrolidinyl)-2,14-cyclotetradecadiene-1,2-dicarboxylate melting at 94° C.–95° C. was obtained.

Example 9

To N-(1-cyclooctenyl)pyrrolidine (64 grams, 0.36 mole) in 200 ml. of ether was added portionwise methyl propiolate (30.2 grams, 0.36 mole), with cooling to keep the temperature below 35° C. The ether was then removed on the steam bath and on cooling the entire residue crystallized. The product, obtained in substantially quantitative yield, is methyl-2-(1-pyrrolidinyl)-1,9-cyclodecadiene-1-carboxylate, M.P. 102° C.–103° C. On hydrolysis with dilute hydrochloric acid the latter gave the partially enolic methyl-10-oxo-2-cyclodecene-1-carboxylate B.P. 103–108° C. at 0.8 mm., $n_D^{20}$ 1.4953, in 50% yield. Hydrogenation of the latter, followed by saponification and decarboxylation gave cyclodecanone in 76% yield.

Example 10

Dimethyl acetylenedicarboxylate (1.42 grams, 0.01 mole) was added to N-(1-cyclohexenyl)morpholine (1.67 grams, 0.01 mole) in 10 ml. of ether. The temperature rose slowly to a maximum of 33° C. and then fell slowly. The mixture was then heated on the steam bath to remove the ether and for an additional 1.5 hour. Addition of ether to the cooled residue gave a solid which was recovered by filtration; wt. 0.91 gram or 29% yield. This solid product was dimethyl 3-morpholinyl-2,8-cyclooctadiene-1,2-dicarboxylate having a melting point of 216° C.–217°C.

Example 11

(a) 5 grams of dimethyl acetylenedicarboxylate were added portionwise to 8.5 grams of N-(1-cyclododecenyl)pyrrolidine in 25 ml. of ether, with cooling to maintain the temperature at 30° C.–35° C. The mixture was then heated on the steam bath to remove ether, taking the temperature to 85° C. Addition of pentane to the cooled residue gave 12.35 grams (90.5%) of crude reaction product. Recrystallization from an ether-pentane mixture gave 7.4 grams of dimethyl 3-(1-pyrrolidinyl)-2,14-cyclotetradecadiene-1,2-dicarboxylate melting at 94° C.–95° C. From the filtrate, a second crop of 2.9 grams was obtained.

(b) 73 grams of dimethyl 3-(1-pyrrolidinyl)-2,14- cyclotetradecadiene-1,2-dicarboxylate were treated with a solution of 50 ml. of concentrated hydrochloric acid in 200 ml. of water to give 52 grams (83%) of dimethyl-3-hydroxy-2,14-cyclotetradecadiene-1,2-dicarboxylate (or its corresponding keto form), M.P. 73° C.–74° C. Hydrogenation of 43 grams (0.133 mole) of the latter compound in 300 ml. of methanol over 2 grams of 5% palladium-on-carbon at room temperature gave 36 grams (84%) of dimethyl-3-oxo-cyclotetradecane-1,2-dicarboxylate (or the corresponding enol), M.P. 93° C. This compound has an odor very similar to that of cyclotetradecanone, though less intense due to its lower vapor pressure. It is a useful and valuable perfume ingredient, both as an odorant and a fixative.

Example 12

To a solution of 20.0 grams (0.12 mole) of N-(1-cycloheptenyl)pyrrolidine in 50 ml. ether was added with stirring and cooling 10.5 grams (0.12 mole) of methyl propiolate. The temperature was maintained at 20° C.–30° C. until no more evolution of heat was noted, after which the mixture was chilled strongly. A solid precipitated which was removed by filtration. When dry, this solid weighed 20.0 grams had a melting point of 82° C.–87° C. and had infrared and nuclear magnetic resonance spectra consistent with the product of ring-enlargement, methyl 2-(1-pyrrolidinyl)-cyclonona-1,8-diene-1-carboxylate. On standing overnight at room temperature or on treatment with dilute aqueous hydrochloric acid, this solid was converted to an isometric yellow oil of unknown structure.

This oil was hydrogenated in acetic acid solution over 5 grams of 5% palladium on carbon.

When approximately one mole of hydrogen had been absorbed, the rate of absorption dropped sharply and the hydrogenation was stopped. After filtration to remove the catalyst and evaporation of excess acetic acid, the residue was taken up in water and the resulting solution was made basic by the addition of an aqueous 10% NaOH solution. The basic solution was extracted with ether to yield, after evaporation of the ether, 13.5 grams of methyl 2-(1-pyrrolidinyl)-cyclonon-1-ene-1-carboxylate, having a melting point of 84° C.–85.5° C. after crystallization from methanol. Methyl 2-(1-pyrrolidinyl)-cyclonon-1-ene-1-carboxylate (6.0 grams) was dissolved in 35 ml. of methanol and to the solution was added 8 ml. of aqueous 25% NaOH. The solution was distilled to remove most of the methanol. The mixture was extracted with ether to remove an oil which had separated. Distillation of the ether extract yielded 3.2 g. of cyclononanone.

*Example 13*

8.4 grams of methyl propiolate were added dropwise, with stirring, to 50 ml. of a solution of refluxing hexane containing 23.5 grams of N-(1-cyclododecenyl)pyrrolidine. The mixture was stirred for 5 minutes with no external heating after the addition was completed. At this stage the ring enlargement product, methyl 2-(1-pyrrolidinyl) - 1,13 - cyclotetradecadiene-1-carboxylate, M.P. 60° C.–62° C., can be obtained in 82% yield by chilling and filtration of the hexane solution. It is not necessary to isolate this compound, however, for the purposes of the further transformations described hereinafter. The hexane was distilled off in vacuo. A solution of concentrated hydrochloric acid (15 ml.) in water (30 ml.) was added to the residue and the resulting mixture was warmed on the steam bath for 10 minutes at 50° C.–60° C. The mixture was then cooled and filtered to give 20.5 grams (77%) of methyl 2-hydroxy-1,13-cyclotetradecadiene-1-carboxylate. This compound is a useful perfume ingredient both as an odorant and a fixative, with an odor very similar to that of cyclotetradecanone. A sample, recrystallized from methanol, melted at 48° C.–49° C.

Methyl 2 - hydroxy - 1,13 - cyclotetradecadiene-1-carboxylate (13.5 grams, 0.05 mole) was dissolved in methanol (100 ml.) and the resulting solution was passed through a 1" x .5" column of Alcoa activated alumina. The solution was then treated with activated charcoal and filtrated through a bed of Super Cel. The filtrate was hydrogenated at room temperature, 40 p.s.i., using 2 grams of 5% Pd on Al₂O₃ as catalyst, until one equivalent of hydrogen was absorbed. The catalyst was removed by filtration and the solvent was distilled in vacuo leaving 12.5 grams (93%) of crude methyl 2-keto-cyclotetradecane-1-carboxylate as an oily residue. This compound has an odor very similar to that of cyclotetradecanone itself and can be used as an odorant for perfume.

The 12.5 grams (0.0467 mole) of crude methyl 2-keto-cyclotetradecane-1-carboxylate was mixed with a solution of 12.2 grams of 50% sodium hydroxide solution, water (100 ml.), and methanol (50 ml.), and the mixture was stirred for 72 hours at room temperature. The solid, which separated, was removed by filtration and dried in a vacuum oven to give 6.5 grams (66% based on 0.0467 mole of starting ketoester) of cyclotetradecanone melting at 51° C.–52° C. Cyclotetradecanone is useful as an odorant for perfume.

The substitution of higher alkyl esters of propiolic acid, e.g. ethyl, propyl or butyl is without significant effect on the over-all yield of cyclotetradecanone, when they are substituted for methyl propiolate in this process.

The following tabulation further illustrates the new alicyclic enamine compounds of the invention. These compounds are prepared by reacting the reactants set forth in accordance with the teachings given hereinbefore.

| | Alicyclic enamine | Reactants |
|---|---|---|
| 14 | Ethyl-2-(1-pyrrolidnyl)-1,6-cycloheptadiene-1-carboxylate. | (a) N-(1-cyclopenten-1-yl) pyrrolidine. (b) Ethyl propiolate. |
| 15 | n-Propyl-2-(1-pyrrolidinyl)-1,6-cycloheptadiene-1-carboxylate. | (a) N-(1-cyclopenten-1-yl) pyrrolidine. (b) n-Propyl propiolate. |
| 16 | Di-(n-butyl)-3-(1-pyrrolidinyl)-2,7-cycloheptadiene-1,2-dicarboxylate. | (a) N-(1-cyclopenten-1-yl) pyrrolidine. (b) Di-n-butyl acetylene-dicarboxylate. |
| 17 | Diethyl-3-(1-morpholinyl)-2,8-cyclooctadiene-1,2-dicarboxylate. | (a) N-(1-cyclohexenyl) morpholine. (b) Diethyl acetylene-dicarboxylate. |
| 18 | Di-(n-butyl)-3-(1-pyrrolidinyl)-2,10-cyclodecadiene-1,2-dicarboxylate. | (a) N-(1-cyclooctenyl)-pyrrolidine. (b) Di-n-butyl acetylene-dicarboxylate. |
| 19 | Diisopropyl-3-(1-piperidyl)-2,10-cyclodecadiene-1,2-dicarboxylate. | (a) N-(1-cyclooctenyl)-piperidine. (b) Diisopropyl acetylene-dicarboxylate. |
| 20 | Methyl-2-(1-pyrrolidinyl)-1,10-cycloundecadiene-1-carboxylate. | (a) N-(1-cyclononen)-pyrrolidine. (b) Methyl propiolate. |
| 21 | Dimethyl-3-(1-pyrrolidinyl)-2,11-cycloundecadiene-1,2-dicarboxylate. | (a) N-(1-cyclononen)-pyrrolidine. (b) Dimethyl acetylene-dicarboxylate. |
| 22 | Methyl-2-(1-piperidyl)-1,11-cyclododecadiene-1-carboxylate. | (a) N-(1-cyclodecene)-piperidine. (b) Methyl propiolate. |
| 23 | Dimethyl-2-(1-piperidyl)-2,12-cyclododecadiene-1,2-dicarboxylate. | (a) N-(1-cyclodecene)-piperidine. (b) Dimethyl acetylene-dicarboxylate. |
| 24 | Methyl-2-(1-pyrrolidinyl)-1,12-cyclotridecadiene-1-carboxylate. | (a) N-(1-cycloundecene)-pyrrolidine. (b) Methyl propiolate. |
| 25 | Dimethyl-3-(1-pyrrolidinyl)-2,13-cyclotridecadiene-1,2-dicarboxylate. | (a) N-(1-cycloundecene)-pyrrolidine. (b) Dimethyl acetylene-dicarboxylate. |
| 26 | Methyl-2-(1-morpholinyl)-1,14-cyclopentadecadiene-1-carboxylate. | (a) N-(1-cyclotridecene)-morpholine. (b) Methyl propiolate. |
| 27 | Dimethyl-3-(1-Pyrrolidinyl)-2,15-cyclopentadecadiene-1,2-dicarboxylate. | (a) N-(1-cyclotridecene)-pyrrolidine. (b) Dimethyl acetylene-dicarboxylate. |
| 28 | Methyl-2-(1-pyrrolidinyl)-1,15-cyclohexadecadiene-1-carboxylate. | (a) N-(1-cyclotetradecene) pyrrolidine. (b) Methyl propiolate. |
| 29 | Dimethyl-3-(1-pyrrolidinyl)-2,16-cyclohexadecadiene-1,2-dicarboxylate. | (a) N-(1-cyclotetradecene) pyrrolidine. (b) dimethyl acetylene-dicarboxylate. |
| 30 | Methyl-2-(1-pyrrolidinyl)-1,16-cycloheptadecadiene-1-carboxylate. | (a) N-(1-cyclopentadecene) pyrrolidine. (b) Methyl propiolate. |
| 31 | Dimethyl-3-(1-pyrrolidinyl)-2,17-cycloheptadecadiene-1,2-dicarboxylate. | (a) N-(1-cyclopentadecene)pyrrolidine. (b) Dimethyl acetylene-dicarboxylate. |
| 32 | Methyl-2-(1-pyrrolidinyl)-1,17-cyclooctadecadiene-1-carboxylate. | (a) N-(1-cyclooctadecene) pyrrolidine. (b) Methyl propiolate. |
| 33 | Dimethyl-3-(1-pyrrolidinyl)-2,18-cyclooctadecadiene-1,2-dicarboxylate. | (a) N-(1-cyclooctadecene) pyrrolidine. (b) Dimethyl acetylene-dicarboxylate. |

As noted hereinbefore, while the compounds obtained on hydrolysis of the new alicyclic enamine compounds of the invention are referred to as hydroxy compounds enol-keto tautomerism is believed to be involved. In the hydrolysis reaction, the saturated heterocyclic nucleus represented by

is removed. The exact nature of this heterocyclic nucleus appears to be immaterial insofar as the reactivity of the alicyclic enamine compounds is concerned.

Examples 1, 9, 12 and 13 disclose the preparation of known carbocyclic ketone compounds. The general procedure employed in these examples can be used to prepare the other known carbocyclic ketones, referred to hereinbefore, having 7 to 18 carbon atoms in the ring.

In addition to the utility of the monocarboxylic alicyclic enamine compounds of the invention in the preparation of ketones, the dicarboxylic compounds of the invention are useful in preparing polymeric compounds. For example, the dicarboxylic acids of Example 6 may be polymerized with glycols to produce polyesters and the like.

The invention has been described in detail with particular reference to preferred embodiments thereof, but it will be understood that variations and modifications can be effected within the spirit and scope of the invention as described hereinbefore and as defined in the appended claims.

I claim:

1. A compound having the formula:

wherein R represents alkyl represents a member selected from the group consisting of pyrrolidino, piperidino, morpholino and hexamethyleneimino, X represents a member selected from the class consisting of hydrogen and —COOR, wherein R has the meaning previously assigned to it, Y represents alkylene of 3 to 14 carbon atoms and wherein when Y is $$-CH_2CH_2CH_2CH_2-$$

X is —COOR.

2. The process of preparing a compound having the formula:

wherein R represents alkyl represents a member selected from the group consisting of pyrrolidino, piperidino, morpholino and hexamethyleneimino, X represents a member selected from the class consisting of hydrogen and —COOR, wherein R has the meaning previously assigned to it, Y represents alkylene of 3 to 14 carbon atoms and wherein when Y is $$-CH_2CH_2CH_2CH_2-$$

X is —COOR, which comprises reacting a compound having the formula:

wherein has the meaning previously assigned to it and Z is alkylene of 2 to 13 carbon atoms with a compound having the formula:

$$X-C\equiv C-COOR$$

wherein R and X have the meaning previously assigned to them and wherein when Z is —CH$_2$CH$_2$CH$_2$— X is —COOR.

3. The process of preparing a compound having the formula:

wherein R represents alkyl and Y is —CH$_2$(CH$_2$)$_8$CH$_2$— which comprises reacting a compound having the formula:

wherein Z is —CH$_2$(CH$_2$)$_7$CH$_2$ with a compound having the formula:

$$ROOC-C\equiv C-COOR$$

wherein R has the meaning previously assigned to it.

4. The process of preparing a compound having the formula:

wherein R represents alkyl and Y is —CH$_2$(CH$_2$)$_8$CH$_2$— which comprises reacting a compound having the formula:

wherein Z is —CH$_2$(CH$_2$)$_7$CH$_2$— with a compound having the formula:

$$ROOC-C\equiv C-COOR$$

wherein R has the meaning previously assigned to it.

5. The process of preparing a compound having the formula:

wherein R represents alkyl and Y is —CH$_2$(CH$_2$)$_8$CH$_2$— which comprises reacting a compound having the formula:

wherein Z is —CH$_2$(CH$_2$)$_7$CH$_2$ with a compound having the formula:

$$ROOC-C\equiv C-COOR$$

wherein R has the meaning previously assigned to it.

6. A compound having the formula:

wherein R represents alkyl and Y is —CH$_2$(CH$_2$)$_8$CH$_2$—.

7. A compound having the formula wherein R represents alkyl and Y is —CH$_2$(CH$_2$)$_8$CH$_2$—.

8. A compound having the formula wherein R represents alkyl and Y is —CH₂(CH₂)₈CH₂—.

9. Dimethyl-3-(pyrrolidino) - 2,14 - cyclotetradecadiene-1,2-dicarboxylate.

10. Dimethyl-3-(pyrrolidino) - 2,15 - cyclopentadecadiene-1,2-dicarboxylate.

11. The process of preparing dimethyl-3-(pyrrolidino)-2,14 - cyclotetradecadiene-1,2-dicarboxylate which comprises reacting dimethyl acetylenedicarboxylate with N-(1-cyclododecenyl)pyrrolidine.

12. The process of preparing dimethyl-3-(pyrrolidino)-2,15 - cyclopentadecadiene-1,2-dicarboxylate which comprises reacting dimethyl acetylenedicarboxylate with N-(1-cyclotridecene)pyrolidine.

No references cited.

NCHHOLAS S. RIZZO, *Primary Examiner.*
JOHN D. RANDOLPH, *Examiner.*